US011838489B2

(12) United States Patent
Abhishek et al.

(10) Patent No.: US 11,838,489 B2
(45) Date of Patent: *Dec. 5, 2023

(54) EVENT-BASED TRIGGER INTERVAL FOR SIGNALING OF RTCP VIEWPORT FOR IMMERSIVE TELECONFERENCING AND TELEPRESENCE FOR REMOTE TERMINALS

(71) Applicant: TENCENT AMERICA LLC, Palo Alto, CA (US)

(72) Inventors: Rohit Abhishek, San Jose, CA (US); Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/890,042

(22) Filed: Aug. 17, 2022

(65) Prior Publication Data

US 2022/0394232 A1    Dec. 8, 2022

Related U.S. Application Data

(63) Continuation of application No. 17/095,282, filed on Nov. 11, 2020, now Pat. No. 11,470,300.

(Continued)

(51) Int. Cl.
*H04N 13/194*    (2018.01)
*H04N 7/15*      (2006.01)
(Continued)

(52) U.S. Cl.
CPC ............. *H04N 13/194* (2018.05); *H04N 7/15* (2013.01); *H04N 23/698* (2023.01);
(Continued)

(58) Field of Classification Search
CPC ...... H04N 23/698; H04N 7/15; H04N 13/194; H04N 7/14; H04N 7/157; H04N 7/12; H04N 2007/145; H04N 1/32
(Continued)

(56) References Cited

U.S. PATENT DOCUMENTS

2013/0250786 A1    9/2013  Balasaygun et al.
2015/0215627 A1    7/2015  Gu
(Continued)

OTHER PUBLICATIONS

Extended European Search Report dated Aug. 1, 2022 in European Application No. 21799483.9.
(Continued)

*Primary Examiner* — Maria El-Zoobi
(74) *Attorney, Agent, or Firm* — Sughrue Mion, PLLC

(57) ABSTRACT

There is included a method and apparatus comprising computer code configured to cause a processor or processors to perform controlling a delivery of a video conference call to a viewport, setting an event-based threshold with respect to the video conference call, determining whether the event-based threshold has been triggered based on an event and whether an amount of time having elapsed from another event is less than a predetermined amount of time, and further controlling the delivery of the video conference call to the viewport based on determining whether the event-based threshold has been triggered and whether the amount of time having elapsed from the other event is less than the predetermined amount of time.

20 Claims, 14 Drawing Sheets

Related U.S. Application Data

(60) Provisional application No. 63/022,394, filed on May 8, 2020.

(51) Int. Cl.
　　*H04N 23/698*　　(2023.01)
　　*H04N 13/366*　　(2018.01)
　　*H04N 13/332*　　(2018.01)
　　*H04N 13/302*　　(2018.01)

(52) U.S. Cl.
　　CPC ......... *H04N 13/302* (2018.05); *H04N 13/332* (2018.05); *H04N 13/366* (2018.05)

(58) Field of Classification Search
　　USPC ...................................................... 348/14.02
　　See application file for complete search history.

(56) References Cited

U.S. PATENT DOCUMENTS

| | | | |
|---|---|---|---|
| 2018/0013980 A1* | 1/2018 | Oyman | H04N 7/15 |
| 2019/0364261 A1* | 11/2019 | Hwang | H04N 21/85406 |
| 2020/0059628 A1 | 2/2020 | Cranfill et al. | |
| 2020/0077124 A1 | 3/2020 | Shi et al. | |
| 2020/0322395 A1* | 10/2020 | Copley | H04N 7/157 |
| 2020/0336801 A1* | 10/2020 | Harviainen | H04N 21/854 |
| 2021/0029326 A1* | 1/2021 | Oyman | H04N 7/15 |
| 2021/0044982 A1* | 2/2021 | Damnjanovic | H04W 16/10 |
| 2021/0306665 A1* | 9/2021 | Hourunranta | H04N 13/111 |

OTHER PUBLICATIONS

InterDigital Communications, Inc., "On ITT4RT Systems and Operations", 3GPP TSG-SA4 Meeting #106, S4-191120, 2019 (5 pages total).

H. Schulzrinne et al., Columbia University, "RTP: A Transport Protocol for Real-Time Applications, Jul. 2003", 89 pages.

International Search Report dated Jun. 30, 2021, issued by the International Searching Authority in application No. PCT/US2021/026792.

J. Ott et al., Helsinki University of Technology, "Extended RTP Profile for Real-time Transport Control Protocol (RTCP)-Based Feedback (RTP/AVPF)", Jul. 2006, 51 pages.

S4-200261, "ITT4RT Permanent Document—Requirements, Working Assumptions and Potential Solutions", 3GPP TSG-SA4 Meeting #107, Wroclaw, Poland, Jan. 20-24, 2020, 31 pages.

Written Opinion dated Jun. 30, 2021, issued by the International Searching Authority in application No. PCT/US2021/026792.

Office Action dated Apr. 28, 2023 in Korean Application No. 10-2022-7010607.

Intel, Nokia Corporation (ITT4RT Co-Rapporteurs), "ITT4RT Permanent Document—Requirements, Working Assumptions, and Potential Solutions", 3GPP TSG-SA4 Meeting #108e, S4-200650, Apr. 6-9, 2020, Online Meeting (42 pages total).

* cited by examiner

1100

1200

1300

EVENT-BASED TRIGGER INTERVAL FOR SIGNALING OF RTCP VIEWPORT FOR IMMERSIVE TELECONFERENCING AND TELEPRESENCE FOR REMOTE TERMINALS

CROSS REFERENCE TO RELATED APPLICATION

The present application is a continuation of U.S. application Ser. No. 17/095,282, filed Nov. 11, 2020, which claims priority to provisional application U.S. 63/022,394 filed on May 8, 2020 which are hereby expressly incorporated by reference, in their entirety, into the present application.

BACKGROUND

1. Field

The present disclosure is directed to Real-Time Transport Control Protocol (RTCP) and more specifically relates to event-based trigger intervals in the RTCP viewport feedback signaling for Immersive Teleconferencing and Telepresence for Remote Terminals.

2. Description of Related Art

Immersive teleconferencing provides in-person, high definition video and audio experience for conferences. It supports real-time, multi-connection streaming of the immersive video on head mounted device (HMD) devices/video player. Immersive teleconferencing allows to experience a life-like communication with high definition video and audio services. It aims to creates an immersive experience for users participating in the conference remotely.

The VR support in multimedia telephony service for IMS (MTSI) and IMS-based telepresence enables the support of an immersive experience for remote terminals joining teleconferencing and telepresence sessions. This enables two-way audio and one-way immersive video e.g. a remote user wearing an HMD participates in a conference and receives an immersive audio and video captured by omnidirectional camera in a conference room, whereas only sends audio and optionally 2D video.

Bandwidth and other technical limitations have precluded improved delivery of immersive video with respect to viewpoint margin update as the HMD spatial orientation is updated remotely in real time.

Therefore, there is a desire for a technical solution to such problems involving network overhead and server computational overheads.

SUMMARY

To address one or more different technical problems, this disclosure provides technical solutions to reduce network overhead and server computational overheads while delivering immersive video with respect to one or more viewport margin updates according to exemplary embodiments There is included a method and apparatus comprising memory configured to store computer program code and a processor or processors configured to access the computer program code and operate as instructed by the computer program code. The computer program code includes controlling code configured to cause the at least one processor to control a delivery of a video conference call to a viewport, setting code configured to cause the at least one processor to set an event-based threshold with respect to the video conference call, determining code configured to cause the at least one processor to determine whether the event-based threshold has been triggered based on an event and whether an amount of time having elapsed from another event is less than a predetermined amount of time, further controlling code configured to cause the at least one processor to further control the delivery of the video conference call to the viewport based on determining whether the event-based threshold has been triggered and whether the amount of time having elapsed from the other event is less than the predetermined amount of time.

According to exemplary embodiments, the event-based threshold comprises at least a degree of change in a spatial orientation of the viewport.

According to exemplary embodiments, determining whether the event-based threshold has been triggered comprises determining whether the spatial orientation of the viewport has been changed by more than the degree of change of the event-based threshold.

According to exemplary embodiments, further controlling the delivery of the video conference call to the viewport comprises delivering at least an additional margin of the video conference call to the viewport in a case in which it is determined that the spatial orientation of the viewport has been changed by more than the degree of change of the event-based threshold.

According to exemplary embodiments, further controlling the delivery of the video conference call to the viewport comprises processing different length packets depending on whether a timer has been triggered or whether the event-based threshold has been triggered.

According to exemplary embodiments, wherein of the different length packets, a first packet that the timer has been triggered is longer than a second packet that the event-based threshold has been triggered.

According to exemplary embodiments, the computer program code further includes further determining code configured to cause the at least one processor to determine whether a frequency at which the event triggers the event-based threshold exceeds a frequency threshold based on whether the amount of time having elapsed from the other event is less than the predetermined amount of time.

According to exemplary embodiments, the computer program code further includes updating code configured to cause the at least one processor to update a timer in response to determining that the frequency at which the event triggers the event-based threshold exceeds the frequency threshold.

According to exemplary embodiments, the viewport is a display of at least one of a headset and a handheld mobile device (HMD).

BRIEF DESCRIPTION OF THE DRAWINGS

Further features, nature, and various advantages of the disclosed subject matter will be more apparent from the following detailed description and the accompanying drawings in which.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
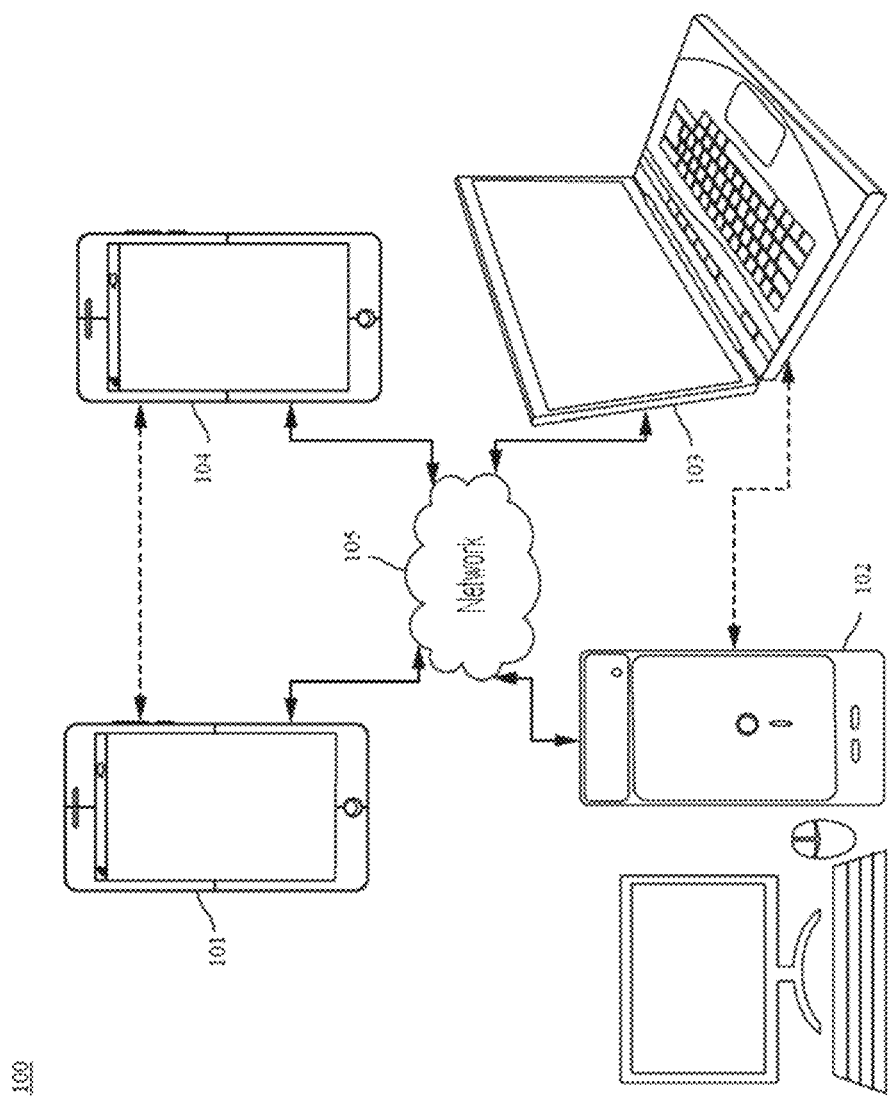
FIG. 1 is a simplified schematic illustration in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
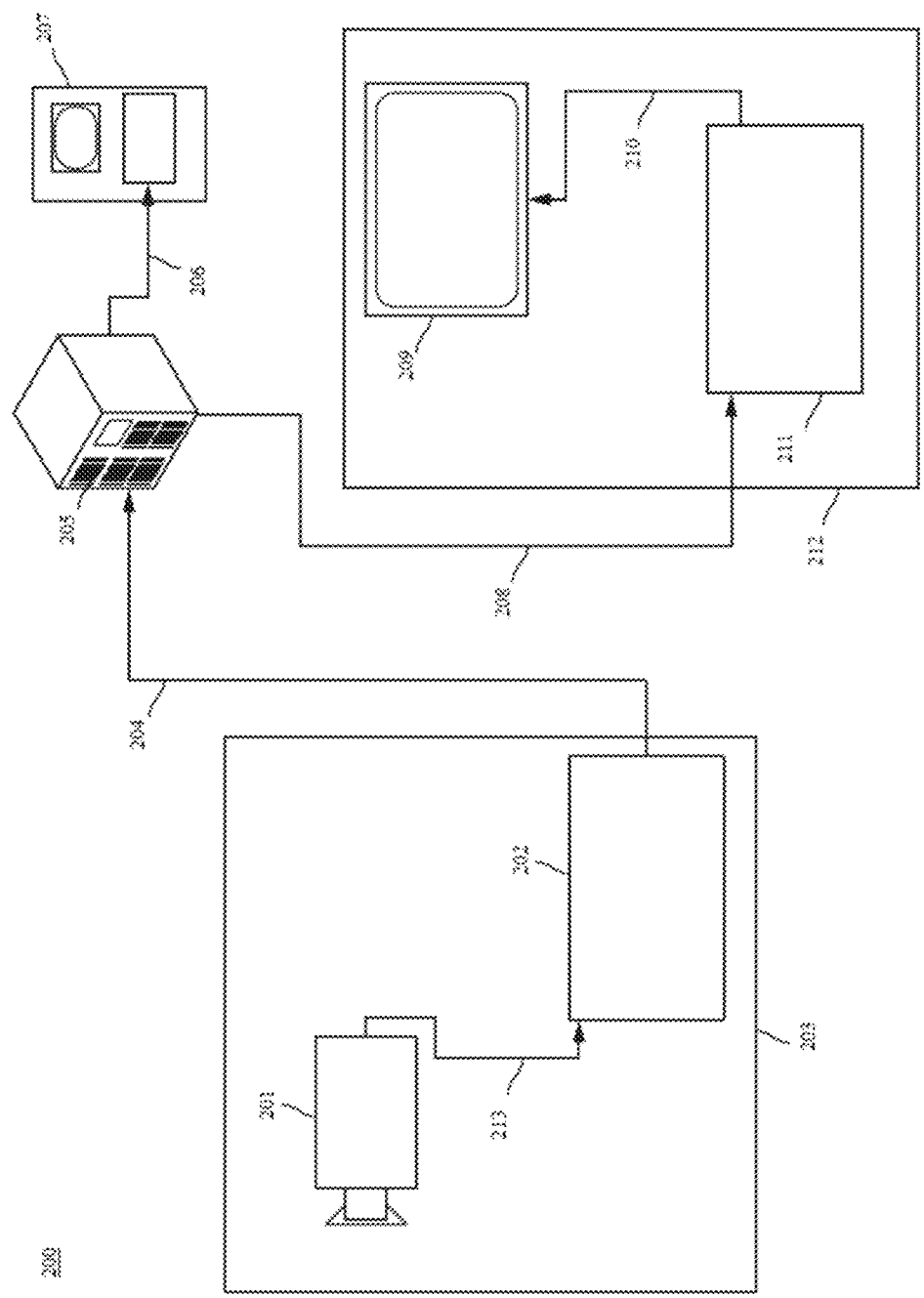
FIG. 2 is a simplified schematic illustration in accordance with embodiments.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the camera 201. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

Figure 3:
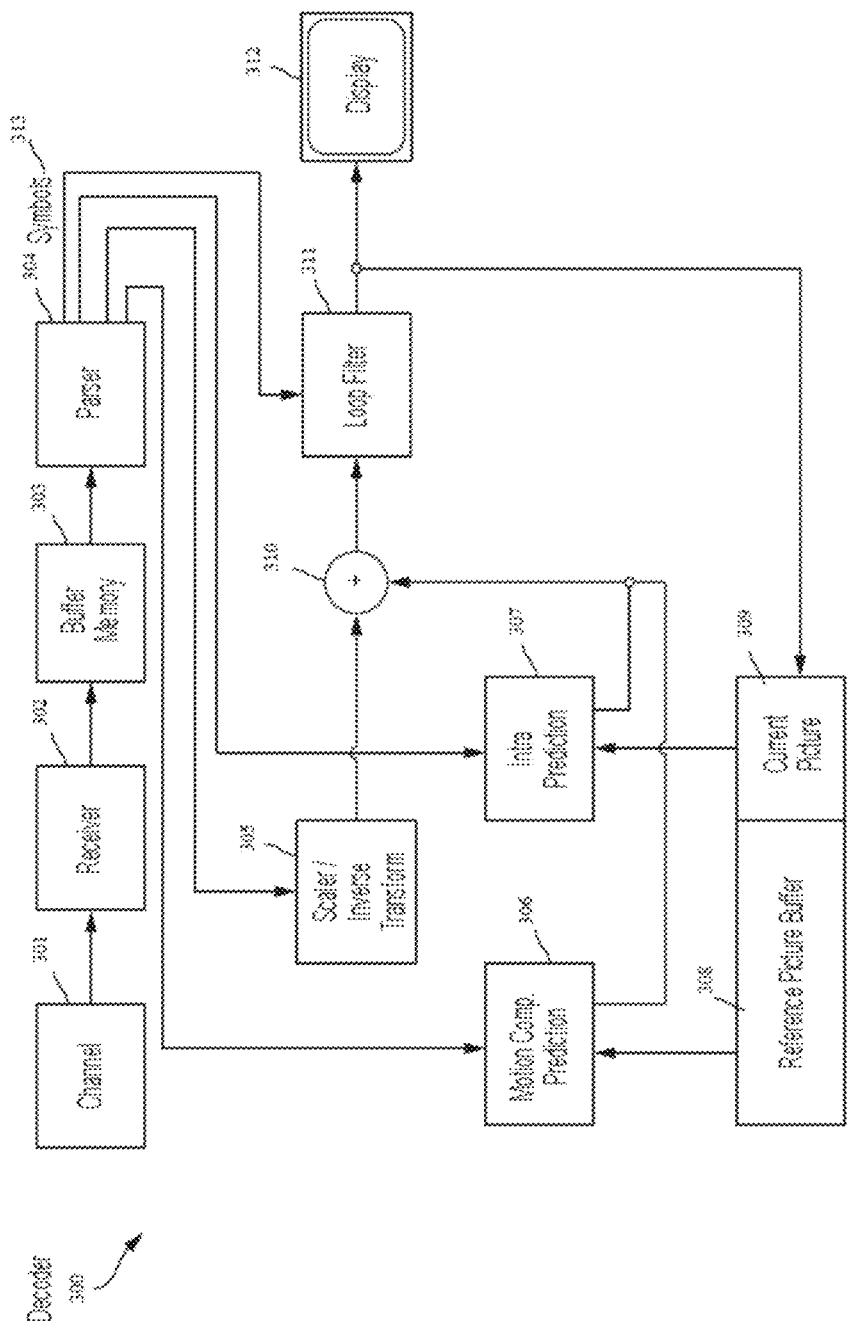
FIG. 3 is a simplified block diagram regarding decoders in accordance with embodiments.

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosychronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
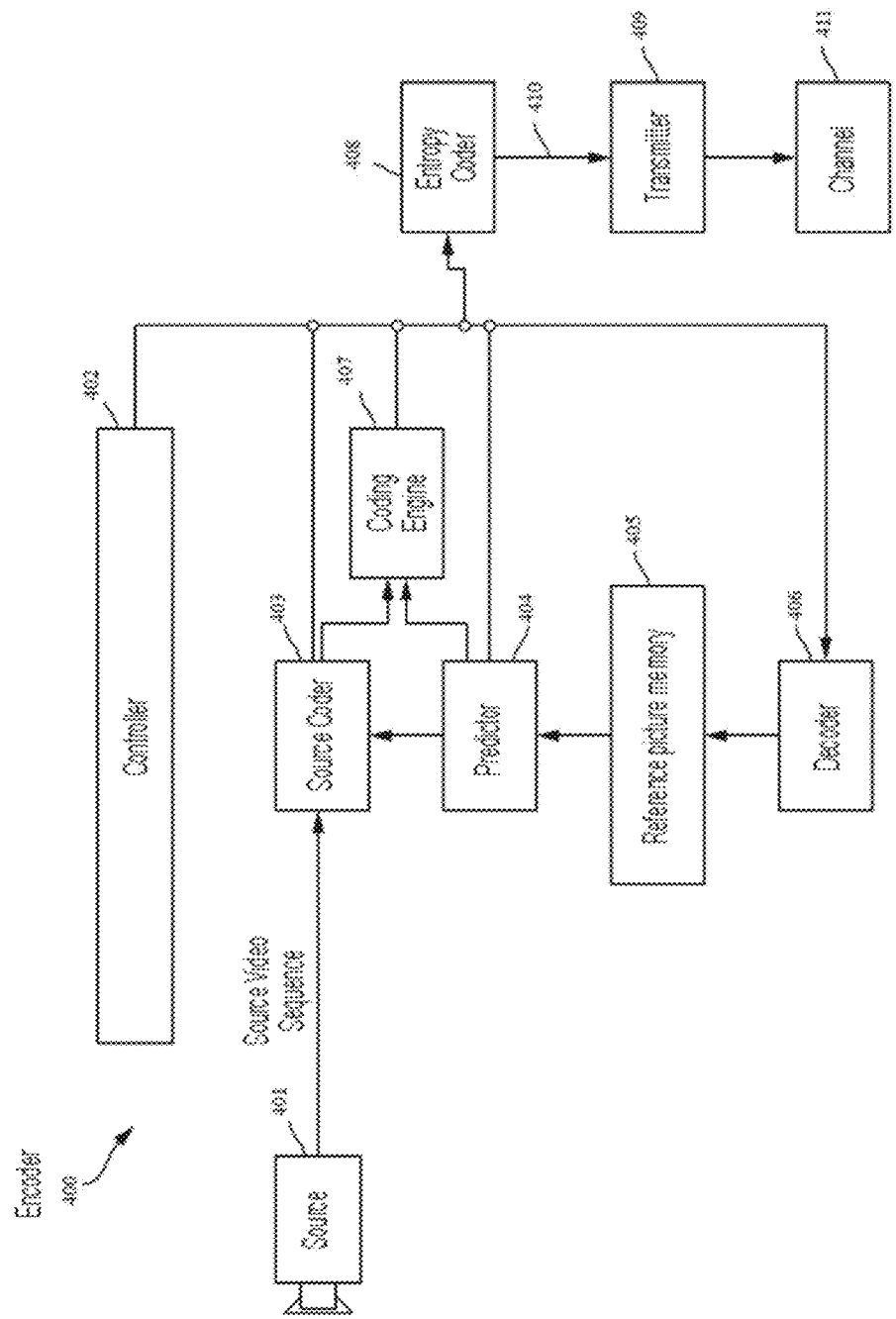
FIG. 4 is a simplified block diagram regarding encoders in accordance with embodiments.

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an oversimplified description, a coding loop can consist of the encoding part of an encoder 402 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture cache 405. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the video coder 403, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence(s) as created by the entropy coder 408 to prepare it for transmission via a communication channel 411, which may be a hardware/software link to a storage device which would store the encoded video data. The transmitter 409 may merge coded video data from the video coder 403 with other data to be transmitted, for example, coded audio data and/or ancillary data streams (sources not shown).

The controller 402 may manage operation of the encoder 400. During coding, the controller 405 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 400 may perform coding operations according to a predetermined video coding technology or standard, such as ITU-T Rec. H.265. In its operation, the video coder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 5:
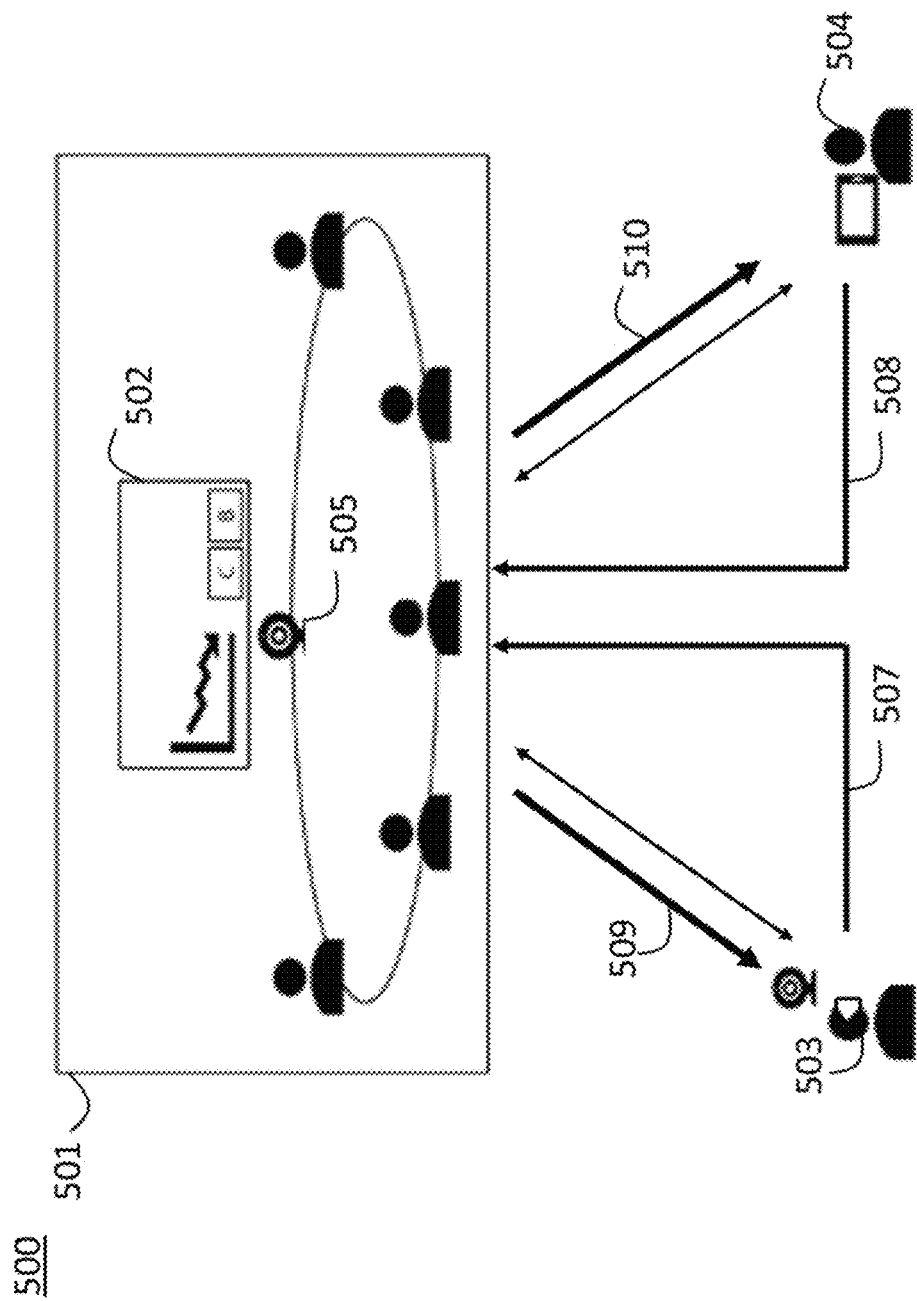
FIG. 5 is a simplified schematic illustration regarding conference call in accordance with embodiments.

FIG. 5 illustrates a call 500, such as a 360-degree conference call according to exemplary embodiments. Referring to FIG. 5, a conference call is being organized in room 501. The room 501 consists of people physically present in the room 501, an omnidirectional camera 505 and a view screen 502. Two other persons 503 and 504 join the meeting, and according to exemplary embodiments, person 503 may be using a VR and/or AR headset and the person 504 may be using a smartphone or tablet. The persons 503 and 504 receive a 360-degree view of the conference room via the omnidirectional camera 505, and the views received may be respective to the persons 503 and 504 which may or may not be viewing different portions of the 360-degree view relative to their specific view-screen orientations for example. The remote participants, persons 503 and 504 for example, also have the option of bringing into focus each other's camera feed. In FIG. 5, persons 503 and 504, send their viewport information 507 and 508 respectively to the room 501, or other networked devices relative to the omnidirectional camera 505 and view screen 502, which in turn sends them the viewport dependent video 509 and 510 respectively.

A remote user, person 503 for example, wearing a head mount display (HMD) joining the conference remotely receives stereo or immersive voice/audio and immersive video from the conference room captured by an omnidirectional camera. The person 504 may also wear a HMD or use a handheld mobile device such as a smartphone or tablet.

According to exemplary embodiments, Omnidirectional Media format (OMAF) defines two types of media profile (i) viewport-independent, and (ii) viewport-dependent. When using a viewport-independent streaming (VIS), the whole video is transmitted at a high quality irrespective of the user's viewport. When VIS is used, no latency is experienced during the HMD movement; however the bandwidth requirement may be relatively high.

Streaming the whole high-resolution immersive videos in desirable quality may be less efficient due to the limitations on the network bandwidth, decoding complexities and the computing constraints of the end devices, since the user's field of view (FoV) may be limited. Therefore, according to exemplary embodiments viewport-dependent streaming (VDS) has been defined in Omnidirectional Media format (OMAF). When VDS is used, only the user's current viewport is streamed in high-quality, while rest is streamed at comparatively lower quality. This helps to save considerable amount of bandwidth.

While using VDS, the remote users, persons 503 and 504 for example, can send their viewport orientation information via RTCP reports. These reports can be sent at fixed intervals, event-based triggers or using a hybrid scheme comprising of the regular interval and event-based triggers.

According to exemplary embodiments, the event-based feedback is triggered whenever the viewport changes and an immediate feedback is sent. The frequency of the RTCP report will be dependent on the speed of the HMD and will increase as the HMD speed increases.

Figure 10:
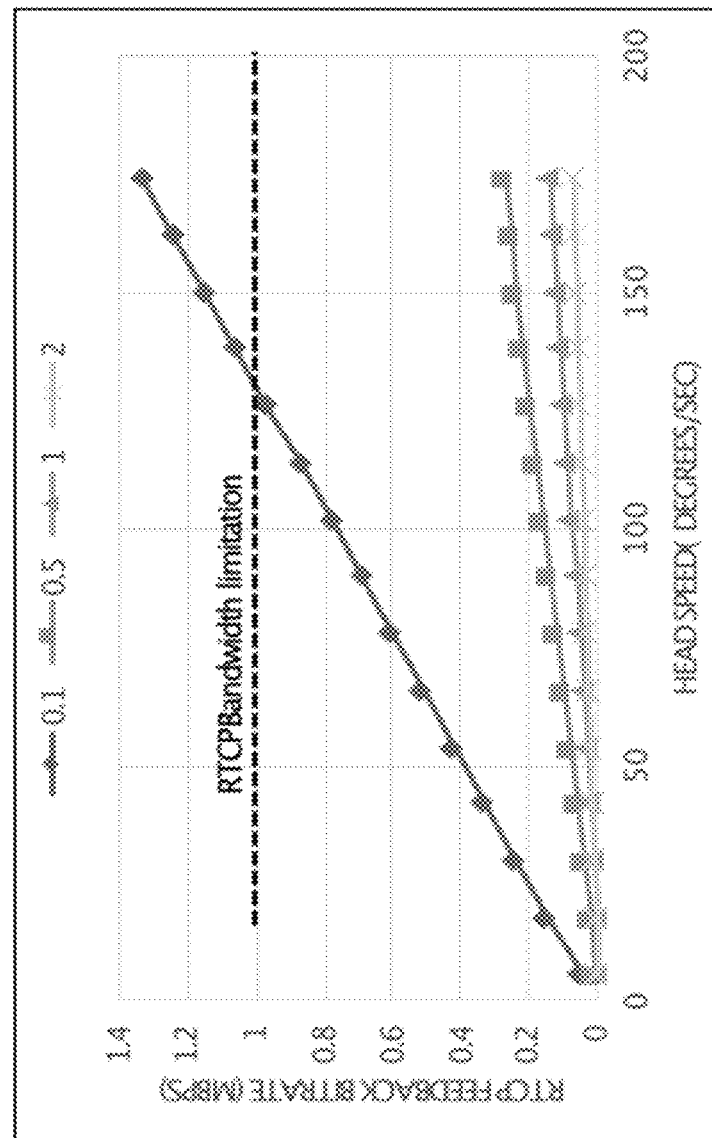
FIG. 10 is a simplified graph diagram in accordance with embodiments.

Now, if the HMD speed is large and the feedback trigger angle is relatively short, a large number of event-based RTCP reports will be generated and sent to the server. This may result in the required bandwidth exceeding the RTCP 5% bandwidth limitations. For example, refer to FIG. 10, for an illustration 1000 of a point to point scenario for 20 Mbps video, when the feedback trigger is 0.1 degrees and the HMD speed exceed 125 degree per seconds, the bandwidth required for the RTCP reports to be sent exceeds the RTCP bandwidth limitation of 1 Mbps. FIG. 10 refers to event-based RTCP feedback generated per second for 0.1, 0.5, 1 and 2 degrees triggers.

Figure 8:
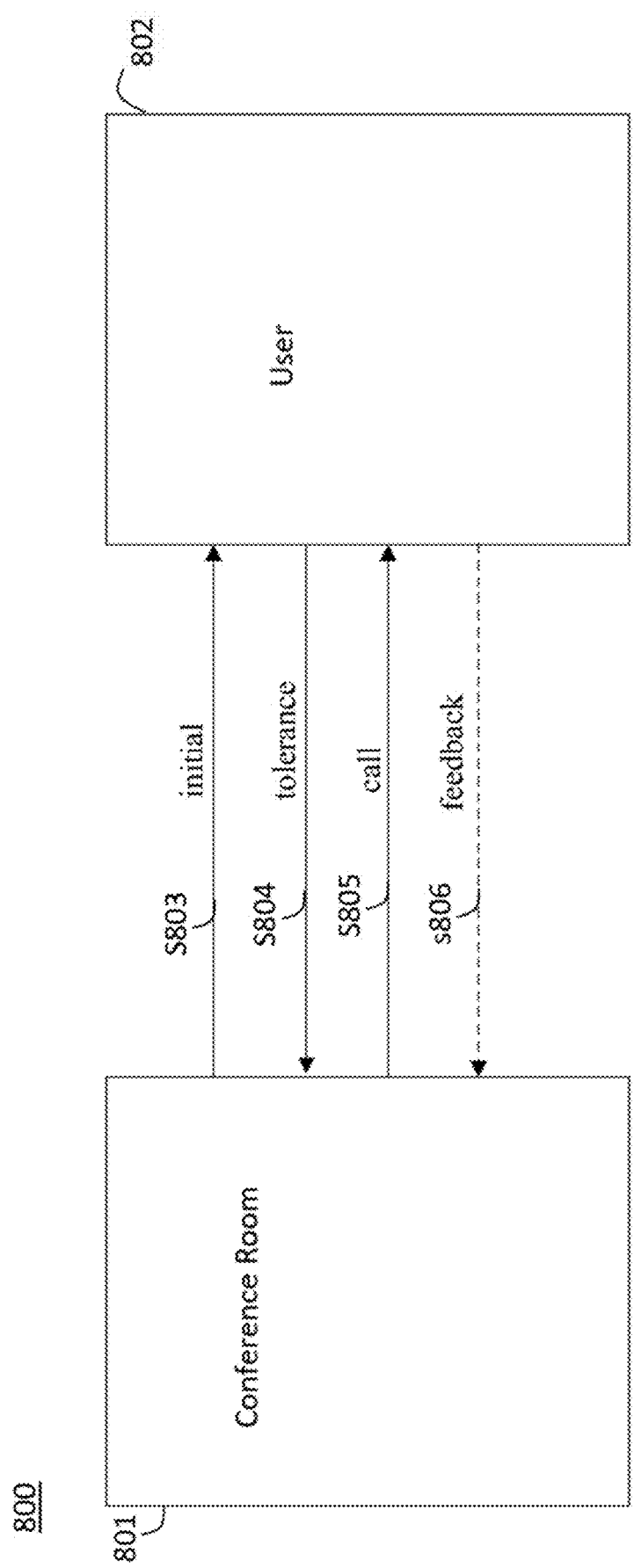
FIG. 8 is a simplified flow diagram in accordance with embodiments.

The initial viewport orientation of the user, decoding/rendering metadata and the captured field-of-view is signaled in the session description protocol (SDP) during the call setup in addition to the normal multimedia telephony service for IMS (MTSI) call signaling, such as at S803 in FIG. 8, between a conference room 801 and a remote user 802. After the call establishment, the remote parties send their viewport orientation information via the RTCP reports.

The RTCP feedback may follow the 5% bandwidth usage rule according to exemplary embodiments. Therefore, the frequency of the RTCP depends on the group size or the number of remote participants. As the group size increases, the feedback can be sent less frequently to abide by the bandwidth usage limitations. Immediate feedback can be used when the number of remote participants is small. As the number of participants increases, early RTCP feedback can be used. However, if the group size becomes large, regular RTCP feedback should be sent. As per internet engineering task force (IETF) request for comments (RFC) 3550 the minimum transmission interval for RTCP may be five seconds. As the group size increases, the RTCP feedback interval can also increase resulting in additional delay. According to exemplary embodiments herein and for use in immersive video for example, the RTCP reports can be sent according to any of a fixed interval-basis and on an event-basis, which can be triggered by the change in viewport orientation per remote person, such as person 503 and/or person 504 in FIG. 5.

According to exemplary embodiments, RTCP Feedback Packets may be compound packets which consists of a status report and feedback (FB) messages. Further, sender report (SR)/received report(RR) packets contain the status reports which are transmitted at regular intervals as a part of the compound RTCP packets which includes the sources description besides other messages.

According to exemplary embodiments, an order of the RTCP packets in the compound RTCP packets containing the FB messages are:
OPTIONAL encrypted prefix,
MANDATORY SR or RR,
MANDATORY SDES,
One or more FB messages.

In the compound packet, the FB messages may be placed after the RR and source description RTCP packets (SDES).

Two compound RTCP packets carrying feedback packets can be described: Minimal Compound RTCP feedback packet and Full compound RTCP feedback packet The RTCP feedback messages are specified in IETF 4585. It can be identified by the PT (payload type)=PSFB (206) which refers to payload-specific feedback message. According to exemplary embodiments, the feedback message may involve signaling of the viewport information for both regular interval and event based.

When any remote participant, such as one of the person 503 and person 504 in FIG. 1, changes its respective viewport (such as by changing a spatial orientation of their respective display device), the RTCP viewport feedback should be timely delivered, else it would cause delay and affect the high-quality VR experience for that user. As the number of remote participants increases, the RTCP feedback interval increases. If the regular RTCP feedback interval is sent, such as on a 5 second basis alone, it may be delayed as the number of remote participants increases. Therefore, according to exemplary embodiments, the RTCP interval may be a combination of the regular feedback interval and an event-based interval so as to improve over such technical deficiencies.

According to exemplary embodiments, a regular RTCP feedback interval should be sent as a compound RTCP packets complying by the RTP rules where the minimum RTCP interval (Tmin) between consecutive transmission should be five seconds. This RTCP interval can be derived from the RTCP packet size and the RTCP bandwidth available. Full compound packet contains any additional RTCP packets such as additional receiver reports, additional SDES items, etc.

When the viewport changes, the event-based feedback is triggered. In this case a minimal compound RTCP packet may be sent. Minimal compound RTCP feedback packet contains only the mandatory information such as the necessary encryption prefix, exactly one SR or RR, exactly one SDES (with only CNAME item present), and the FB message(s). This helps to minimize the RTCP packet transmitted for the feedback, hence will have minimal effect on the bandwidth. The event-based feedback is not affected by the group size unlike the regular RTCP feedback interval.

Figure 7:
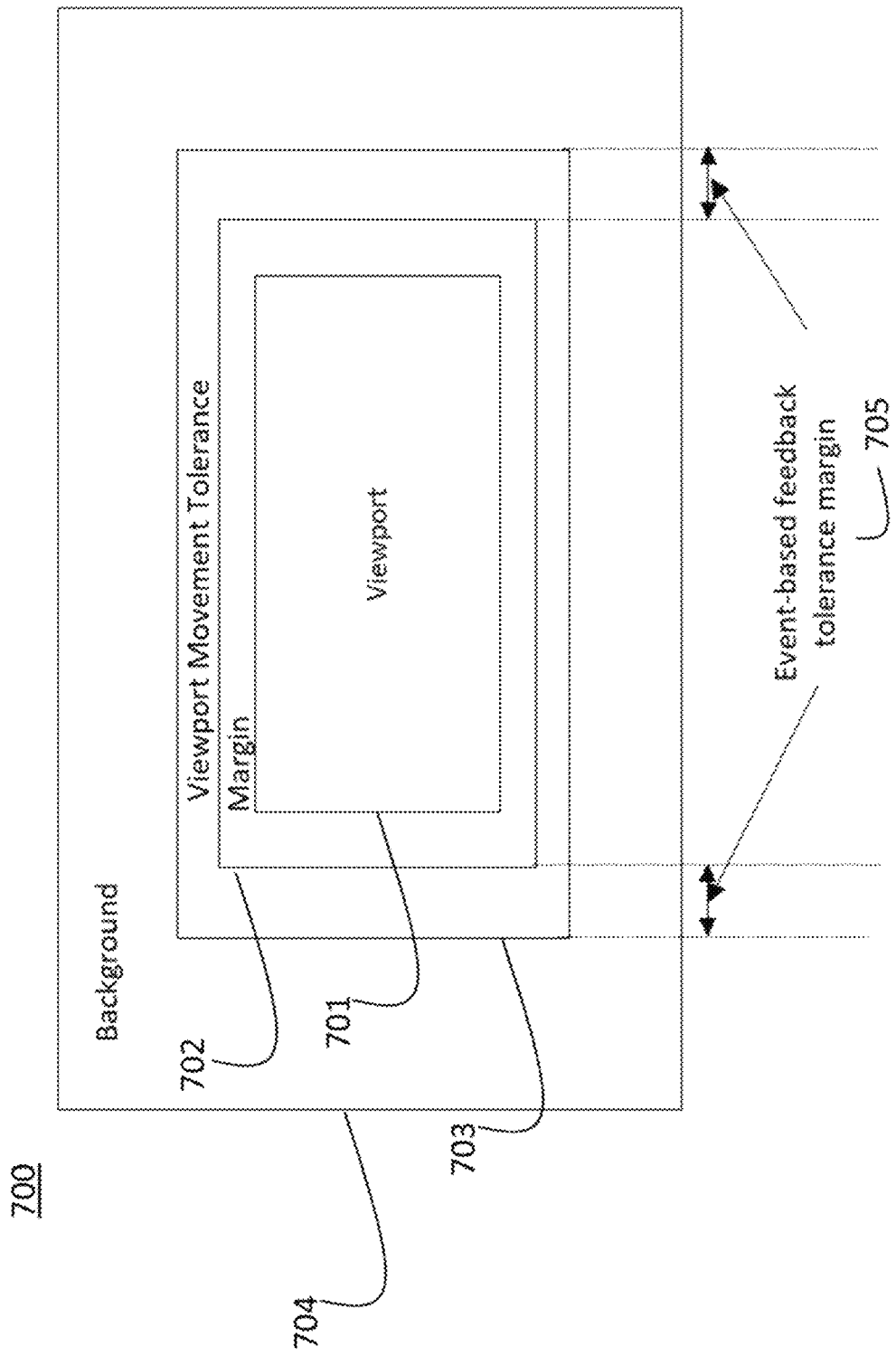
FIG. 7 is a simplified block diagram regarding pictures in accordance with embodiments.

When the user changes the viewport 701, as in FIG. 7, the event-based feedback is triggered, and the regular feedback interval should start after the minimum interval (Tmin). Now, if the user changes its viewport 701 before the minimum interval, the event-based feedback is triggered again. This might affect the 5% bandwidth rule if these events occur successively. However, putting a minimum interval constraint on the event-based feedbacks will degrade the user's experience. Hence, there should be no minimum interval defined for the event-based feedbacks to be sent. To respect the bandwidth usage for the RTCP feedback, the interval for the regular feedbacks can be increased and therefore it should be dependent on the frequency of the event-based feedbacks and the intervals between them.

In view of exemplary embodiments described herein, the user is able to request additional higher quality margins, such as 702 in the illustration 700 of FIG. 7, around the viewport 701 so as to minimize delay, such as an M2HQdelay, and enhance the user experience. The viewport 701 may be the viewport of any of the devices of remote persons 503 and 504 in FIG. 5. This is significantly useful when one of the remote persons 503 and 504 is performing small head motion perturbations. However, during a call, such as at S805 in FIG. 8, when the user moves his head by a (negligibly) small degree which is out of the viewport margin 702, an event-based feedback should not be triggered since the out-of-margin viewport area is comparatively negligible and hence should wait for regular feedback to be transmitted. Therefore, there may be some degree of tolerance 703 defined for yaw, pitch and roll before an event-based feedback can be triggered, for example, see in FIG. 8 at S804 where tolerance information may be transmitted from the remote user 802 to the conference room 801. This degree of tolerance 703, tolerance information including an event-based feedback tolerance margin 705, can be defined as one or more of a rotation angle yaw (tyaw), pitch (tpitch) and roll (troll) from the user's viewport. Such information can be negotiated during the initial SDP session S804, as in FIG. 8, or in-between the session according to embodiments, such as at S806.

Figure 6:
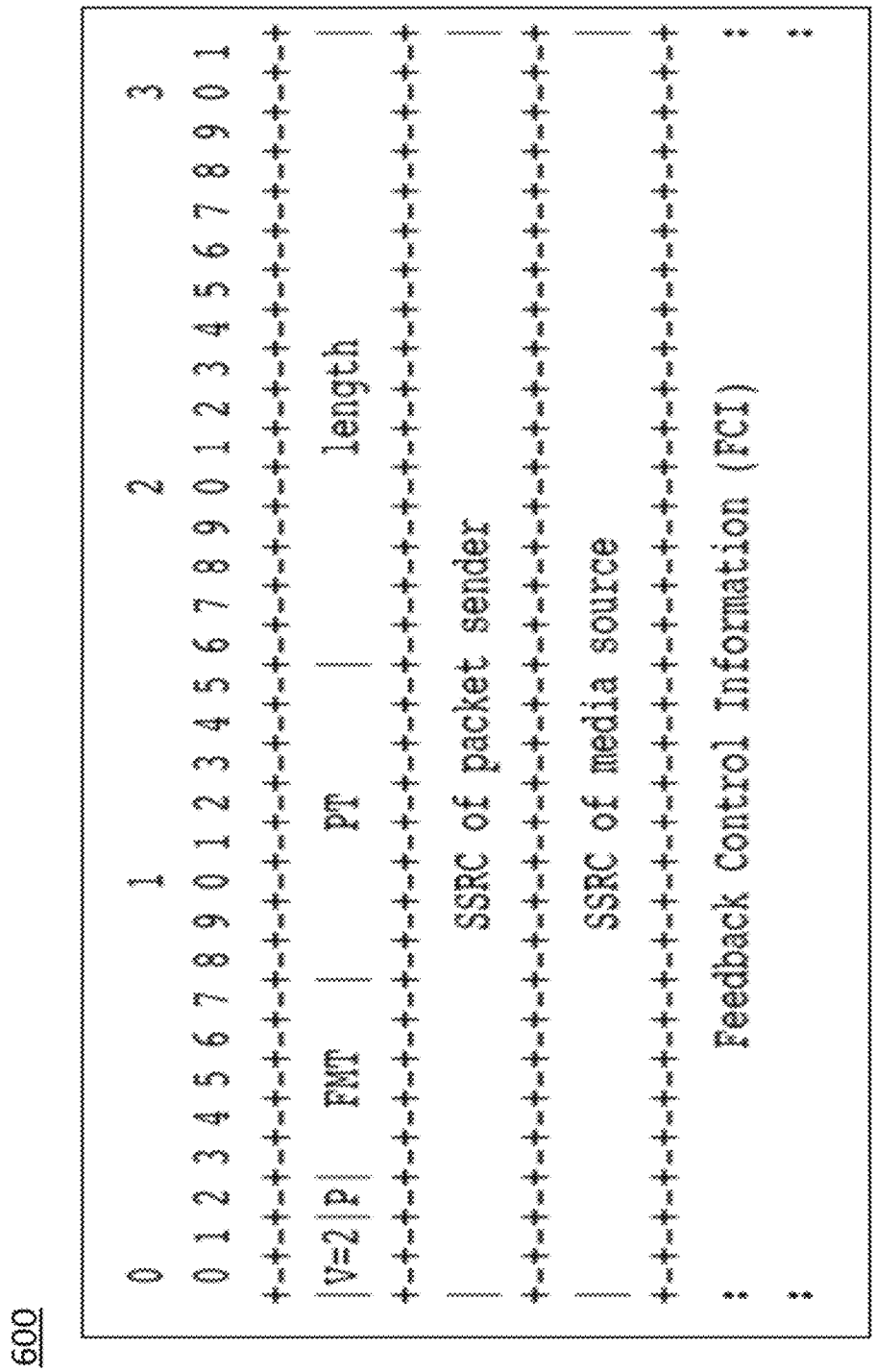
FIG. 6 is a simplified schematic illustration regarding message formats in accordance with embodiments.

FIG. 6 illustrates a format 600 for such feedback messages described herein according to exemplary embodiments.

FIG. 6 shows an RTCP feedback message format 600. In FIG. 6, FMT denotes the feedback message type, whereas PT denotes the payload type. For an RTCP feedback message, the FMT may be set to value '9' whereas the PT is set to 206. The FCI (feedback message control information) contains the viewport information and is composed of the following parameters: Viewport_azimuth; Viewport_elevation; Viewport_tilt; Viewport_azimuth_range; Viewport_elevation_range; Viewport_stereoscopic according to exemplary embodiments.

Figure 9:
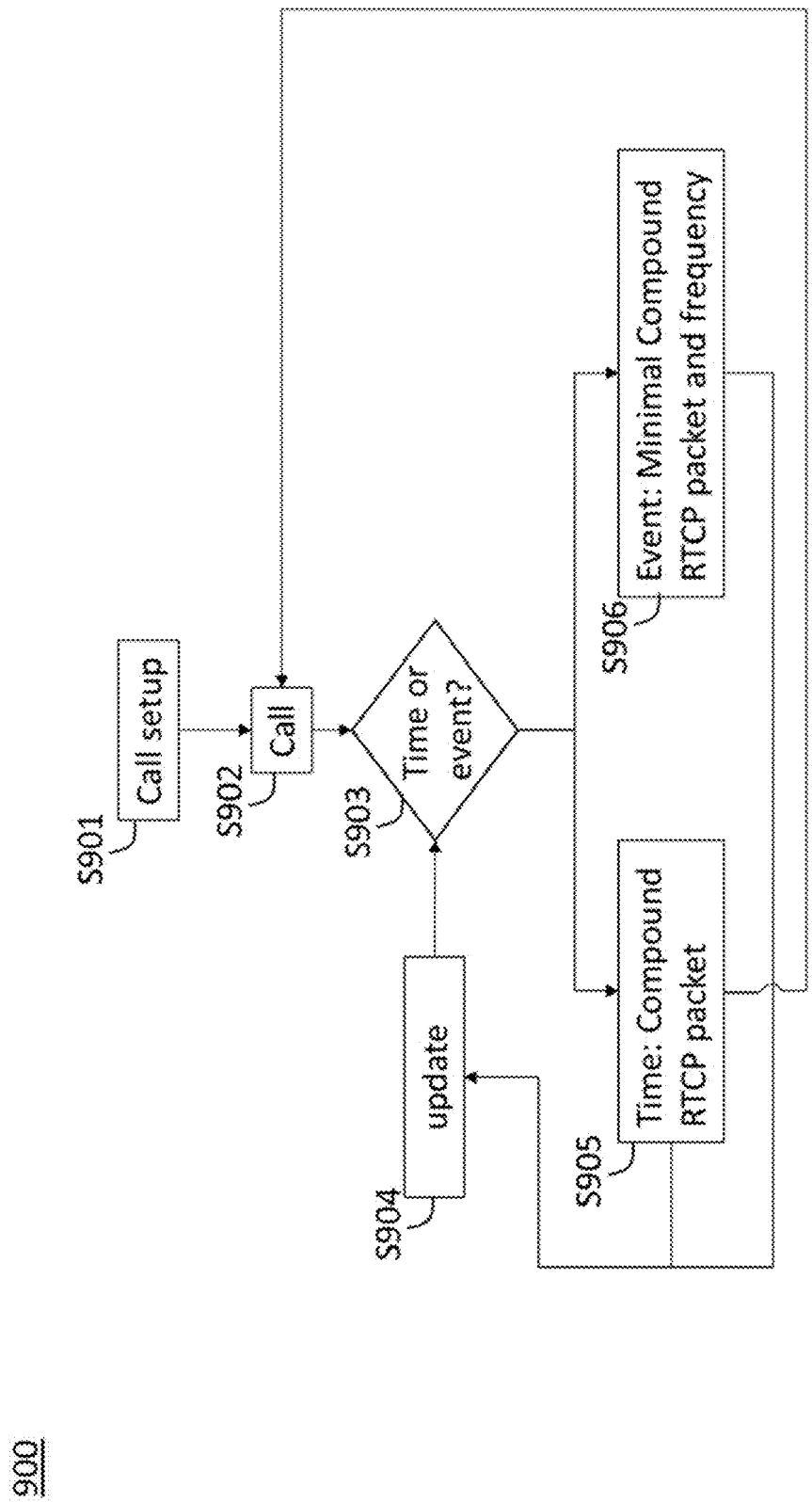
FIG. 9 is a simplified flow chart in accordance with embodiments.

FIG. 9 illustrates a flowchart 900. As S901 there is a call setup 901, including initialization such as at S803 in FIG. 8, and according to embodiments there is provision of information including viewport orientation of the user, decoding/rendering metadata and the captured field-of-view is signaled in the session description protocol (SDP) during the call setup in addition to the normal multimedia telephony service for IMS (MTSI) call signaling. A degree of tolerance, as described above, may be set at this S901.

After the call establishment, at S902, the remote parties send their viewport orientation information via the RTCP reports along with the beginning of the call. Then, at S903, it may be determined whether there is an event-based feedback that is triggered and whether the regular feedback interval is triggered. The regular feedback interval may be triggered by determining whether some time period has passed, such as 5 seconds for example, as a time-based feedback. The event-based feedback may be determined by whether a remote user's viewport has been changed in spatial orientation, and if so, whether that change is within or beyond the preset tolerance ranges, such as with respect to the tolerance margins 705 in FIG. 7.

If the time-based feedback is determined at S905, then a compound RTCP packet may be sent. According to exemplary embodiments, a regular RTCP feedback interval should be sent as a compound RTCP packets complying by the RTP rules where the minimum RTCP interval (Tmin) between consecutive transmission should be five seconds. This RTCP interval can be derived from the RTCP packet size and the RTCP bandwidth available. Full compound packet contains any additional RTCP packets such as additional receiver reports, additional SDES items, etc. Afterwards, it may be determined at S904 whether there is a user input or other input of some update to the tolerance information, and if not, the process may loop or otherwise proceed with the call at S902 in accordance with any communications received with respect to the compound RTCP packet of S905. This S905 may also reset the timer to count another time period, such as 5 seconds.

If the event-based feedback is determined at S906, then a minimal RTCP packet may be sent. For example, when the viewport changes, the event-based feedback is triggered. In this case a minimal compound RTCP packet may be sent. Minimal compound RTCP feedback packet contains only the mandatory information such as the necessary encryption prefix, exactly one SR or RR, exactly one SDES (with only CNAME item present), and the FB message(s). This helps to minimize the RTCP packet transmitted for the feedback, hence will have minimal effect on the bandwidth. The event-based feedback is not affected by the group size unlike the regular RTCP feedback interval. Afterwards, it may be determined at S904 whether there is a user input or other input of some update to the tolerance information, and if not, the process may loop or otherwise proceed with the call at S902 in accordance with any communications received with respect to the minimal RTCP packet of S906. This S906 may also reset the timer to count another time period, such as 5 seconds. Further, it may also be determined at S904, from S906, whether to update the timer to count an increased elapsed time in a case in which it is also determined at S906 that a frequency of the event-based triggering exceeds a threshold, such as contributing to an excess of a 5% bandwidth rule of RTCP for example according to embodiments such as described further with respect to FIGS. 10, 11, 12, and 13.

Exemplary embodiments introduce a parameter for defining the minimum interval between two consecutive event-based RTCP feedbacks, S906 to S906 without an intermediate S905 for example, such that the bandwidth requirement does not exceed the RTCP bandwidth limitation and may be accounted for by update or otherwise at S904.

When a relatively short feedback trigger at S906 is used for a large HMD motion, the RTCP bandwidth requirement may exceed the RTCP bandwidth limitations. Hence, the bandwidth requirement for the event-based RTCP reports may be dependent on the HMD speed and the feedback trigger degree according to exemplary embodiments.

The event-based feedback interval is the time interval between two consecutive triggers. As the HMD speed increases, the event-based feedback interval decreases, resulting in increase in the bandwidth requirement. The event-based feedback can be defined as below:

$$\text{Event-based feedback interval} = \frac{\text{Trigger Angle }(T_A)}{\text{HMD Speed }(H_S)} \quad \text{(Eq. 1)}$$

Therefore, to limit the bandwidth requirement so as to comply by the 5% RTCP rule, a threshold parameter is defined. This threshold parameter may be dependent on the event-based feedback interval.

The following assumptions may be made according to exemplary embodiments:

$$\text{Bandwidth (bps)} = B, \quad \text{(Eq. 2)}$$

$$\text{RTCP allocated bandwidth (bps)} = R_B \quad \text{(Eq. 3)}$$

$$\text{RTCP Packet size (bytes)} = P \quad \text{(Eq. 4)}$$

$$\text{RTCP minimum Interval} = I_{min} \quad \text{(Eq. 5)}$$

The RTCP bandwidth should not exceed the 5% bandwidth as per the RTCP rule. Therefore, $$R_B = 0.05B \quad \text{(Eq. 6)}$$

Whereas, $I_{min}$ can be stated as below, $$I_{min} = \frac{8P}{R_B} \quad \text{(Eq. 7)}$$

Assuming total bandwidth of 20 Mbps, when the feedback degree is 0.1 degree and the HMD speed is over 125 degree/sec, the bandwidth values exceed the 5% RTCP bandwidth limitations. As can be seen from the illustration 1000 in FIG. 10. However, this value is well within the limitations when the trigger increases to 0.5, 1 and 2.

Figure 11:
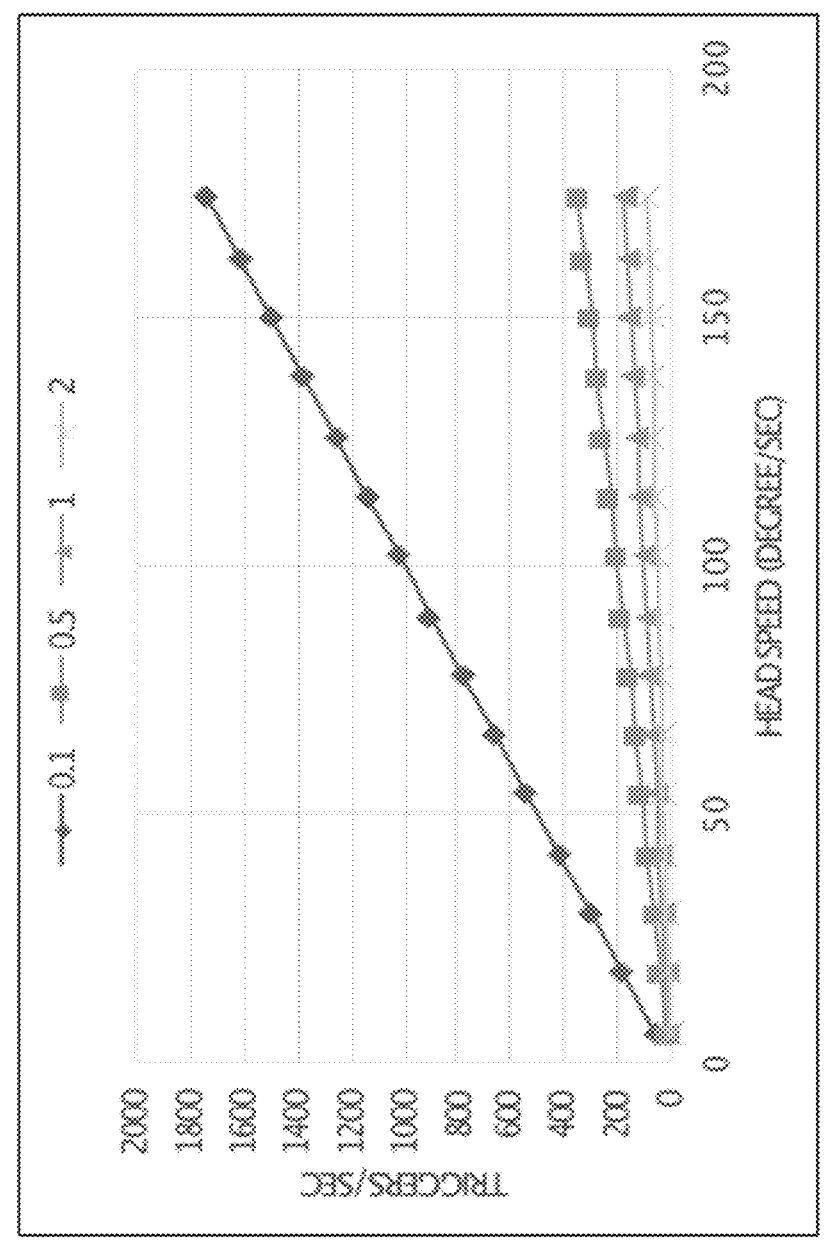
FIG. 11 is a simplified graph diagram in accordance with embodiments.

The number of event-based RTCP feedbacks sent per second for 0.1, 0.5, 1 and 2 degree triggers are shown in the illustration 1100 in FIG. 11. Therefore, to respect the RTCP bandwidth limitation, exemplary embodiments may increase the RTCP event-based feedback interval and introduce a parameter $I_{min}$ which can be defined as the minimum interval between two consecutive RTCP feedbacks and can be chosen such that $$I_{min} = \frac{T_A}{H_S}.$$

Figure 12:
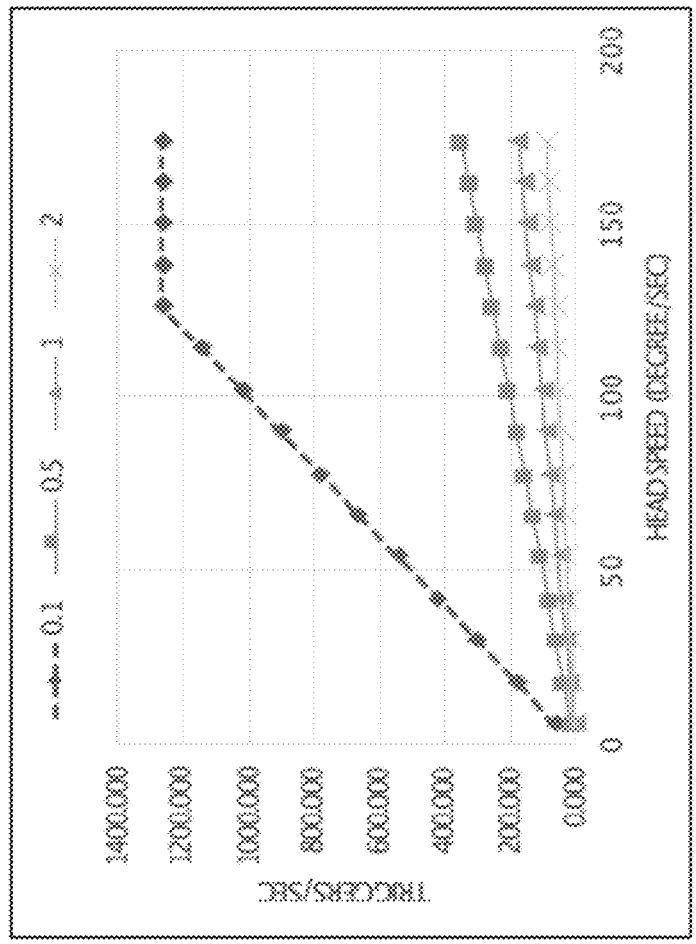
FIG. 12 is a simplified graph diagram in accordance with embodiments.

When the HMD speed increases, the number of triggers per second increases as well resulting in the decrease of the trigger interval and increase of the RTCP bitrate. When the trigger interval reaches a minimum point $I_{min}$, it should not be further decreased, and therefore the maximum number of triggers/sec is reached as in shown in the illustration 1200 of FIG. 12 with the dotted curve. FIG. 12 refers to an event-based RTCP feedback generated per second for 0.1, 0.5, 1, and 2 degrees triggers after the $I_{min}$ parameter is introduced according to embodiments. This minimum point will be reached when RTCP bandwidth ($R_B$) is close to 5% of the bandwidth but not greater. Therefore, $I_{min}$ parameter will be dependent on the allowed RTCP bandwidth. The bitrate before and after introduction of the $I_{min}$ parameter for 0.1-degree trigger is shown in the illustration 1300 of FIG. 13. Hence, after the minimum point $I_{min}$ is reached, the curve flattens.

Figure 13:
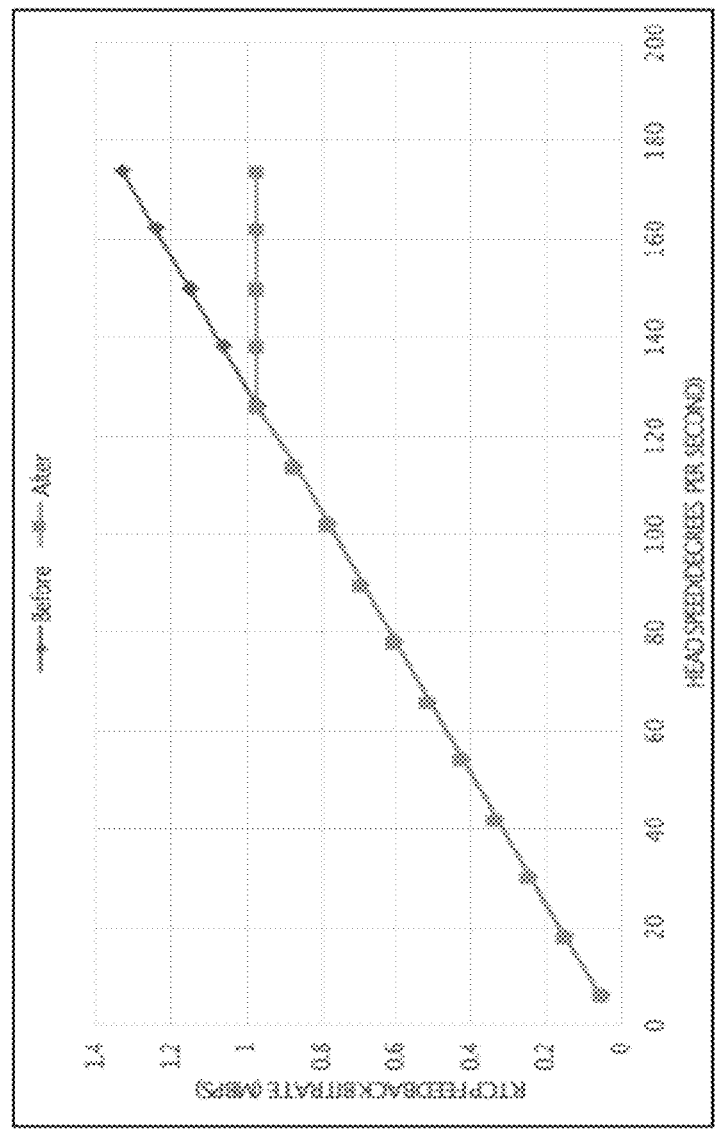
FIG. 13 is a simplified graph in accordance with embodiments.

Referring further to FIG. 13, $I_{min}$ is calculated for a constant head speed and refers to a bit rate for 0.1 degree trigger before and after the $I_{min}$ parameter is introduced according to embodiments. However due to relatively short travel time of the head, the difference between average and constant head speed is negligent.

According to exemplary embodiments, when such a hybrid reporting scheme, consisting of the regular interval and event-based triggers, is used:
(i) The regular interval must be equal or larger than (usually a multiple factor of) the RTCP minimum interval;
(ii) The trigger threshold angle and RTCP minimum interval should be chosen such that $$I_{min} \leq \frac{T_A}{H_S} \quad \text{(Eq. 8)}$$

One or more of such calculations described above with respect to FIGS. 10, 11, 12, and 13 may be performed at S904 in FIG. 9.

Accordingly, by exemplary embodiments described herein, the technical problems noted above may be advantageously improved upon by one or more of these technical solutions. For example, A parameter $I_{min}$, which is defined as the minimum interval between two consecutive triggers, should be introduced for event-based RTCP feedbacks. This helps to restrain the bandwidth requirement by limiting the number of event-based triggers sent per second. Hence, as the head motion increases and the RTCP interval reaches min (Imin) value, the bit rate is saturated and does not increase further.

The techniques described above, can be implemented as computer software using computer-readable instructions and physically stored in one or more computer-readable media or by a specifically configured one or more hardware processors. For example, FIG. 14 shows a computer system 1400 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
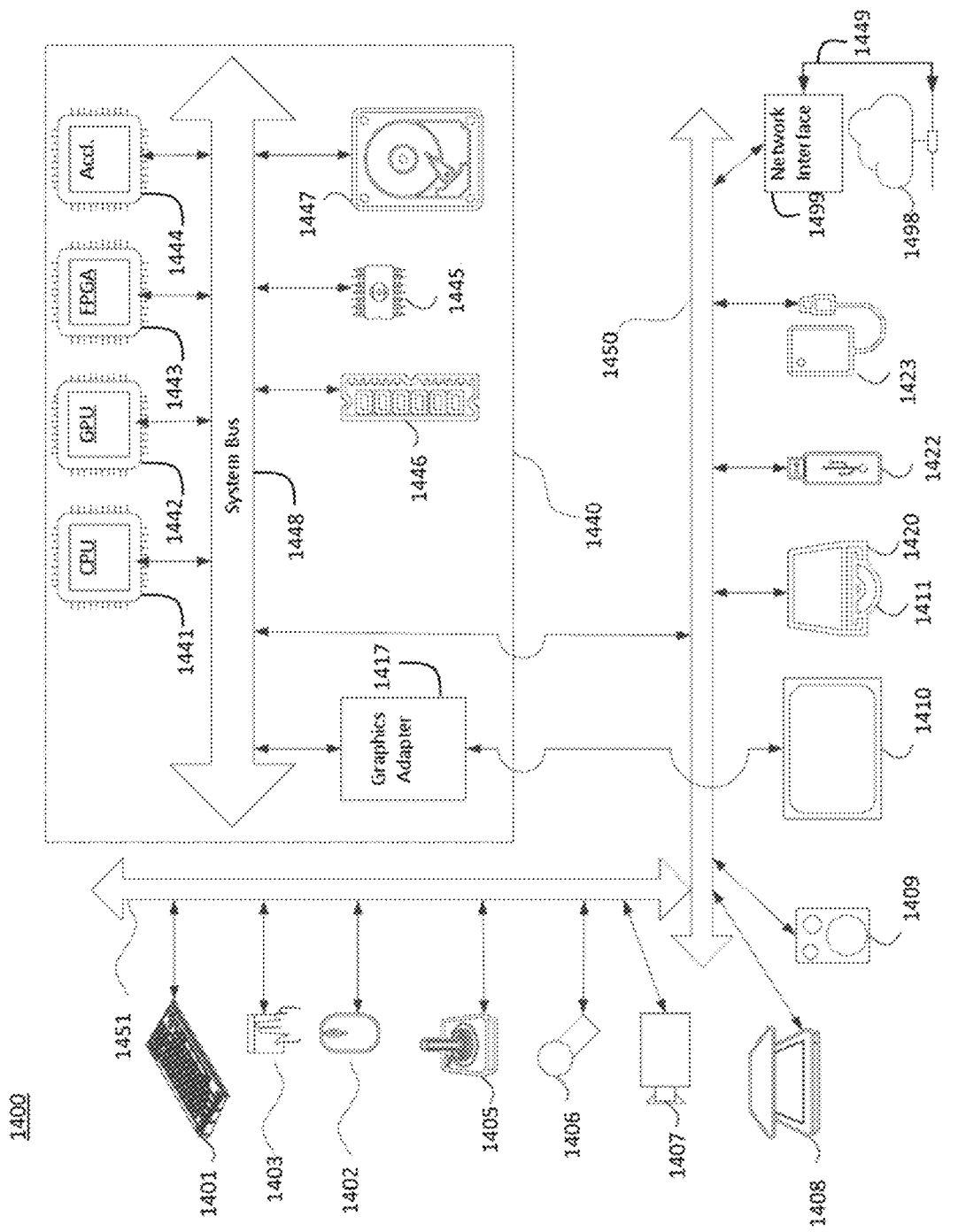
FIG. 14 is a schematic illustration in accordance with embodiments.

The components shown in FIG. 14 for computer system 1400 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1400.

Computer system 1400 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1401, mouse 1402, trackpad 1403, touch screen 1410, joystick 1405, microphone 1406, scanner 1408, camera 1407.

Computer system 1400 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1410, or joystick 1405, but there can also be tactile feedback devices that do not serve as input devices), audio output devices (such as: speakers 1409, headphones (not depicted)), visual output devices (such as screens 1410 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1400 can also include human accessible storage devices and their associated media such as optical media including CD/DVD ROM/RW 1420 with CD/DVD 1411 or the like media, thumb-drive 1422, removable hard drive or solid state drive 1423, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1400 can also include interface 1499 to one or more communication networks 1498. Networks 1498 can for example be wireless, wireline, optical. Networks 1498 can further be local, wide-area, metropolitan, vehicular and industrial, real-time, delay-tolerant, and so on.

Examples of networks 1498 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1498 commonly require external network interface adapters that attached to certain general-purpose data ports or peripheral buses (1450 and 1451) (such as, for example USB ports of the computer system 1400; others are commonly integrated into the core of the computer system 1400 by attachment to a system bus as described below (for example Ethernet interface into a PC computer system or cellular network interface into a smartphone computer system). Using any of these networks 1498, computer system 1400 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1440 of the computer system 1400.

The core 1440 can include one or more Central Processing Units (CPU) 1441, Graphics Processing Units (GPU) 1442, a graphics adapter 1417, specialized programmable processing units in the form of Field Programmable Gate Areas (FPGA) 1443, hardware accelerators for certain tasks 1444, and so forth. These devices, along with Read-only memory (ROM) 1445, Random-access memory 1446, internal mass storage such as internal non-user accessible hard drives, SSDs, and the like 1447, may be connected through a system bus 1448. In some computer systems, the system bus 1448 can be accessible in the form of one or more physical plugs to enable extensions by additional CPUs, GPU, and the like. The peripheral devices can be attached either directly to the core's system bus 1448, or through a peripheral bus 1451. Architectures for a peripheral bus include PCI, USB, and the like.

CPUs 1441, GPUs 1442, FPGAs 1443, and accelerators 1444 can execute certain instructions that, in combination, can make up the aforementioned computer code. That computer code can be stored in ROM 1445 or RAM 1446. Transitional data can be also be stored in RAM 1446, whereas permanent data can be stored for example, in the internal mass storage 1447. Fast storage and retrieval to any of the memory devices can be enabled through the use of cache memory, that can be closely associated with one or more CPU 1441, GPU 1442, mass storage 1447, ROM 1445, RAM 1446, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1400, and specifically the core 1440 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1440 that are of non-transitory nature, such as core-internal mass storage 1447 or ROM 1445. The software implementing various embodiments of the present disclosure can be stored in such devices and executed by core 1440. A computer-readable medium can include one or more memory devices or chips, according to particular needs. The software can cause the core 1440 and specifically the processors therein (including CPU, GPU, FPGA, and the like) to execute particular processes or particular parts of particular processes described herein, including defining data structures stored in RAM 1446 and modifying such data structures according to the processes defined by the software. In addition or as an alternative, the computer system can provide functionality as a result of logic hardwired or otherwise embodied in a circuit (for example: accelerator 1444), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video signaling, the method performed by at least one processor and comprising:
    setting a threshold with respect to a video call;
    determining whether the threshold has been triggered based on an event and whether an amount of time having elapsed from another event is less than a predetermined amount of time; and
    controlling delivery of the video call to a viewport based on determining whether the threshold has been triggered.

2. The method for video signaling according to claim 1, wherein the threshold comprises at least a degree of change in a spatial orientation of the viewport.

3. The method for video signaling according to claim 2, wherein determining whether the threshold has been triggered comprises determining whether the spatial orientation of the viewport has been changed by more than the degree of change of the threshold.

4. The method for video signaling according to claim 3, wherein controlling the delivery of the video call to the viewport comprises delivering at least an additional margin of the video call to the viewport in a case in which it is determined that the spatial orientation of the viewport has been changed by more than the degree of change of the threshold.

5. The method for video signaling according to 1, wherein controlling the delivery of the video call to the viewport comprises processing different length packets depending on whether a timer has been triggered or whether the threshold has been triggered.

6. The method for video signaling according to claim 5, wherein of the different length packets, a first packet that a timer has been triggered is longer than a second packet that the threshold has been triggered.

7. The method for video signaling according to claim 1, further comprising:
    determining whether a frequency at which the event triggers the threshold exceeds a frequency threshold based on determining whether the amount of time having elapsed from the other event is less than the predetermined amount of time.

8. The method for video signaling according to claim 7, further comprising:
    updating a timer in response to determining that the frequency at which the event triggers the threshold exceeds the frequency threshold.

9. The method for video signaling according to claim 1, wherein the viewport is a display of at least one of a headset and a handheld mobile device.

10. The method for video signaling according to claim 1, wherein the video call comprises a 360° video data of an omnidirectional camera.

11. An apparatus for video signaling, the apparatus comprising:
    at least one memory configured to store computer program code;
    at least one processor configured to access the computer program code and operate as instructed by the computer program code, the computer program code including:
        setting code configured to cause the at least one processor to set a threshold with respect to a video conference call;
        determining code configured to cause the at least one processor to determine whether the threshold has been triggered based an event and whether an amount of time having elapsed from another event is less than a predetermined amount of time; and
        controlling code configured to cause the at least one processor to control a delivery of the video call to a viewport based on determining whether the threshold has been triggered.

12. The apparatus for video signaling according to claim 11, wherein the threshold comprises at least a degree of change in a spatial orientation of the viewport.

13. The apparatus for video signaling according to claim 12, wherein determining whether the threshold has been triggered comprises determining whether the spatial orientation of the viewport has been changed by more than the degree of change of the threshold.

14. The apparatus for video signaling according to claim 13, wherein controlling the delivery of the video call to the viewport comprises delivering at least an additional margin of the video call to the viewport in a case in which it is determined that the spatial orientation of the viewport has been changed by more than the degree of change of the threshold.

15. The apparatus for video signaling according to 11, wherein controlling the delivery of the video call to the viewport comprises processing different length packets depending on whether a timer has been triggered or whether the threshold has been triggered.

16. The apparatus for video signaling according to claim 15, wherein of the different length packets, a first packet that the timer has been triggered is longer than a second packet that the threshold has been triggered.

17. The apparatus for video signaling according to claim 11, further comprising:
    further determining code configured to cause the at least one processor to determine whether a frequency at which the event triggers the threshold exceeds a frequency threshold based on determining whether the amount of time having elapsed from the other event is less than the predetermined amount of time.

18. The apparatus for video signaling according to claim 17, further comprising:
    updating code configured to cause the at least one processor to update a timer in response to determining that the frequency at which the event triggers the threshold exceeds the frequency threshold.

19. The apparatus for video signaling according to claim 11, wherein the viewport is a display of at least one of a headset and a handheld mobile device (HMD).

20. A non-transitory computer readable medium storing a program causing a computer to execute a process, the process comprising:
    setting a threshold with respect to a video call;
    determining whether the threshold have been triggered based on an event and whether an amount of time having elapsed from another event is less than a predetermined amount of time; and
    controlling a delivery of the video call to a viewport based on determining whether the threshold has been triggered.

* * * * *